United States Patent [19]

Ogawa et al.

[11] Patent Number: 4,711,285
[45] Date of Patent: Dec. 8, 1987

[54] HIGH-PERFORMANCE PNEUMATIC TIRE HAVING BEAD FILLERS OF ANISOTROPIC ELASTICITY

[75] Inventors: Masaki Ogawa; Takabumi Kudo, both of Tokyo, Japan

[73] Assignee: Bridgestone Corporation, Tokyo, Japan

[21] Appl. No.: 753,949

[22] Filed: Jul. 10, 1985

[30] Foreign Application Priority Data

Jul. 16, 1984 [JP] Japan ................... 59-145919

[51] Int. Cl.⁴ .................. B60C 9/06; B60C 9/08; B60C 15/06
[52] U.S. Cl. .................. 152/458; 152/541; 152/547; 152/559; 152/560; 264/108; 524/511; 525/133; 525/138; 525/145; 525/184; 525/232; 525/236
[58] Field of Search .............. 192/458, 541, 546, 547, 192/526, 559, 560, 564, 565, 539, 548; 156/910; 525/133, 138, 145, 184, 232, 236; 524/511; 264/108

[56] References Cited

U.S. PATENT DOCUMENTS

| | | | |
|---|---|---|---|
| 4,196,106 | 4/1980 | Matsuura et al. | 525/133 X |
| 4,202,850 | 5/1980 | Yamamoto et al. | 264/108 |
| 4,236,563 | 12/1980 | Moers et al. | 152/541 X |
| 4,257,468 | 3/1981 | Ogawa et al. | 152/458 X |
| 4,396,051 | 8/1983 | Ogawa et al. | 152/458 |
| 4,421,891 | 12/1983 | Miyake et al. | 152/541 X |

FOREIGN PATENT DOCUMENTS 59-43041 3/1984 Japan .

Primary Examiner—Donald E. Czaja
Assistant Examiner—Thomas Bokan
Attorney, Agent, or Firm—Schwartz, Jeffery, Schwaab, Mack, Blumenthal & Evans

[57] ABSTRACT

Disclosed is a high-performance tire in which a bead filler formed of a rubber composition fills up a space between each turn-up portion of the carcass and a major portion of the carcass and extends to some extent along the carcass toward the tread. The rubber composition is anisotropic such that the elastic modulus in the direction circumferential of the tire is distinctly higher than in the direction radial of the tire. Such anisotropy can be produced by incorporating short fiber of a suitable thermoplastic polymer such as nylon into the rubber composition. This tire provides both improved controllability and a good ride.

9 Claims, 1 Drawing Figure

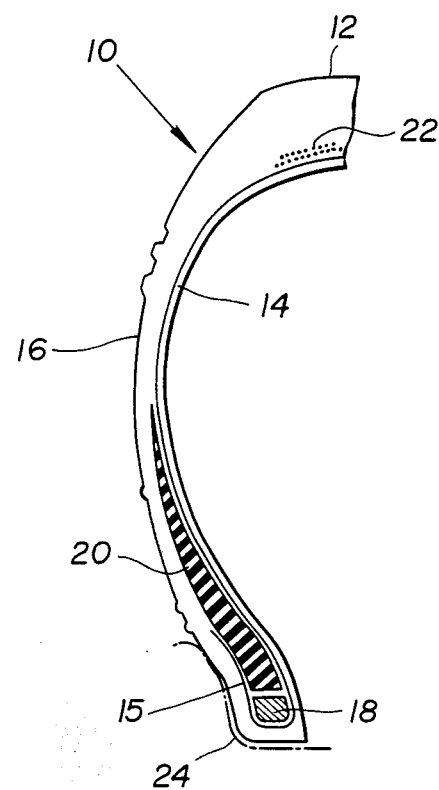

HIGH-PERFORMANCE PNEUMATIC TIRE HAVING BEAD FILLERS OF ANISOTROPIC ELASTICITY

BACKGROUND OF THE INVENTION

This invention relates to a pneumatic tire having elastomeric fillers in edge portions near the beads for the purpose of providing not only improved controllability and stability but also a good ride.

In recent automobiles, radial-ply tires are increasingly taking the place of the traditional bias-ply tires to meet the demand for better controllability and stability at high speeds and longer durability. In the meantime the turning and road-holding performance of radial-ply tires has been further improved by increasing the stiffness in the belted region and also in the bead regions to thereby enhance a side force at any given steering angle. However, it is natural that the tires improved in such a manner give rather a rough ride.

Of course some measures have been taken to prevent significant degradation of the ride comfort of high-performance tires, and it has been accepted as a favorable measure to lower the modulus of elasticity of the side walls of the tires. Nowadays, however, it is difficult to maintain the ride comfort at a satisfactory level by such a method, because in the current tires designed so as to make a contribution to the improvement in the fuel consumption the shock absorbing effect of each component has considerably lowered. In the present situation, it is almost inevitable to sacrifice the controllability or stability of tires to some extent for maintaining the ride comfort at a tolerable level.

SUMMARY OF THE INVENTION

It is an object of the present invention to provide a high-performance pneumatic tire which is excellent in not only controllability and stability but also ride comfort.

The present invention provides a high-performance pneumatic tire comprising a tread, side walls, a carcass which comprises layers of rubberized cords laid parallel and is wrapped around a bead in each edge portion thereof so as to provide a turn-up portion, and a bead filler for each bead. Each bead filler fills up the space between the turn-up portion of the carcass and the major portion of the carcass and extends along the outer side of the carcass toward the tread. Each bead filler is formed of a rubber composition which is anisotropic such that the modulus of elasticity of the bead filler measured under tension in the direction circumferential of the tire to the extent of 20% stretch is not lower than 40 kg/cm$^2$ and is 2.0–6.0 times as high as the modulus of elasticity of the same bead filler measured under tension in the direction radial of the tire to the extent of 20% stretch.

As the basis of the present invention we have discovered an important fact, which is summarized as follows. The modulus of elasticity of the bead fillers greatly influences the controllability and stability of the tire (which become better as the value of a side force at any given steering angle becomes larger and as the value of the maximum side force becomes larger), but the contribution of the elastic modulus in the direction radial of the tire is not so great as the contribution of the elastic modulus in the direction circumferential of the tire. This tendency becomes particularly notable in respect of the controllability and stability of the tire at high speeds. This fact suggests that the torsional rigidity of the tire has an essential and great influence on the controllability and stability, especially at high speeds, and that it will be possible to obtain a high-performance tire in which controllability and ride comfort are well balanced by using bead fillers formed of a material having such anisotropy that the modulus of elasticity in the direction circumferential of the tire is higher than the modulus of elasticity in the direction radial of the tire. As a result of an exhaustive study on this matter we have reached the present invention in which the anisotropy of the bead filler material is numerically specified as stated above.

In the following description, "elastic modulus (A)" means the elastic modulus of the bead filler measured under tension in the direction circumferential of the tire to the extent of 20% stretch, and "elastic modulus (B)" the elastic modulus of the same bead filler measured under tension in the direction radial of the tire to the extent of 20% stretch.

To obtain a tire which provides both improved controllability and stability and a good ride, it is necessary that the elastic modulus (A) of the bead filler material is at least 40 kg/cm$^2$ and is 2.0–6.0 times as high as the elastic modulus (B). If the elastic modulus (A) is below 40 kg/cm$^2$ it is difficult to provide satisfactory controllability and stability. If the elastic modulus (A) is less than 2.0 times as high as the elastic modulus (B), it is impossible to provide improved controllability and stability and a good ride simultaneously. If the elastic modulus (A) is more than 6.0 times as high as the elastic modulus (B), the durability of the tire becomes insufficient when used under high-load or high-speed conditions. This is because the bead filler material of such a high degree of anisotropy contains a very large amount of fiber which is oriented to a high degree, so that cracks are liable to grow in the direction of orientation of the fiber. The reason for measuring the elastic modulus under 20% stretch condition is that external forces that act on the bead regions of the tire are usually of relatively small magnitude.

The present invention is very suited for applications to tires for automobiles of any type and any size. The basic tire construction is not limited: it may be bias-ply, radial-ply or belted bias-ply. The effects of the bead fillers according to the invention include improved durability of the tire besides good balancing between controllability and ride comfort.

BRIEF DESCRIPTION OF THE DRAWING

The single FIGURE is a partial, sectional and schematic view of a pneumatic tire according to the invention.

DESCRIPTION OF THE PREFERRED EMBODIMENTS

The FIGURE in the drawing shows a general shape and disposition of a bead filler 20 according to the invention in a tire 10. As is usual, the tire 10 is fundamentally made up of a tread 12, carcass plies 14 and side walls 16. In an edge portion the carcass plies 14 are wrapped around a bead wire 18 so as to provide a turn-up portion 15. Numeral 22 indicates a belt layer, and numeral 24 a wheel rim. The bead filler 20 fills up the space between the turn-up portion 15 and the major portion of the carcass plies 14 and extends to some extent along the carcass plies 14 toward the tread 12.

The length of the bead filler 20 in a cross section of the tire 10 is usually smaller than a half of the height of the tire 10, though it is not strictly specified.

The material of the bead filler 20 is a rubber composition. To render the rubber composition anisotropic as specified hereinbefore, the present invention uses short fiber of an organic polymer as an important ingredient of the rubber composition. It is suitable to use 15 to 70 parts, and preferably 25 to 60 parts, by weight of short fiber having a mean diameter not greater than 1 μm per 100 parts by weight of the rubber component of the composition. If the amount of the short fiber is less than 15 parts by weight, it is difficult to meet the requirement that the elastic modulus (A) be at least 40 kg/cm² and at least 2.0 times as high as the modulus (B). On the other hand, if the amount of the short fiber is more than 70 parts by weight the rubber composition becomes inferior in formability or workability. This is a serious disadvantage from an industrial point of view. Besides, the use of an excessively large amount of short fiber is unfavorable for the durability of the tire as mentioned hereinbefore.

It is preferable that the elastic modulus (A) is 3.0–6.0 times as high as the elastic modulus (B). To make the elastic modulus (A) at least 3 times as high as the elastic modulus (B) it is preferable to use at least 25 parts by weight of short fiber per 100 parts by weight of rubber. Also it is preferable to avoid using more than 60 parts by weight of short fiber per 100 parts by weight of rubber for obtaining a rubber composition sufficiently high in rupture strength.

The short fiber is required to be not larger than 1 μm in mean diameter. When a stress acts on the bead filler the magnitude of stress per unit surface area of the short fiber becomes greater as the mean diameter of the fiber becomes larger. The use of short fiber having a mean diameter larger than 1 μm is unfavorable for the durability of the tire because cracking of the bead filler is liable to begin at an end of a fiber filament. Usually, the lengths of short fiber filaments used in this invention are from about 1 μm to about 100 μm.

As to the material of the short fiber, it is preferred to use a thermoplastic polymer having acid amide bond (represented by the formula)

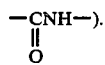

Such a polymer gives short fiber high in strength because the polymer has a melting point above 200° C. and, when extruded, is high in the tendency toward orientation crystallization with little possibility of forming spherulites. In other words, it is preferred to use short fiber of nylon. However, it is also possible to use short fiber of a different type of thermoplastic polymer such as syndiotactic 1,2-polybutadiene or isotactic polypropylene.

When using short fiber of a thermoplastic polymer having acid amide bond, it is desirable to make the short fiber graft to the rubber component of the bead filler material via a novolak, i.e. product of initial-stage condensation polymerization reaction between phenol and formaldehyde. By doing so, the adhesion between the short fiber and the rubber is strengthened and therefore the durability of the tire is improved.

The invention will further be illustrated by the following nonlimitative examples.

EXAMPLE 1

1. Preparation of Master Batch Containing Short Fiber

In a Banbury mixer kept heated at 150° C. and operated at 100 rpm, 1400 g of natural rubber was masticated for 1 min together with 14 g of N-(3-methacryloyloxy-2-hydroxypropyl)-N'-phenylenediamine used as antioxidant. The Mooney viscosity of the natural rubber at 100° C. was 25. Then 700 g of 6-nylon (tradename 1030B from Ube Kosan Co., Ltd.; m.p. 221° C., MW 30000) was added to the masticated rubber, and kneading was performed for 7 min while the temperature in the mixer was raised up to 232° C. to completely melt 6-nylon. After that the temperature of the mixer was kept at 230° C., and 30 g of a phenol-formaldehyde novolak (tradename 550PL from Meiwa Kasei Co., Ltd.) was added and the mixture was kneaded for 7 min. Then 3 g of hexamethylene tetramine was added, and kneading was continued for additional 2.5 min to thereby accomplish curing of the novolak resin accompanied by grafting of 6-nylon to the rubber.

The blend obtained by the above kneading procedure was extruded into the shape of a strand. The extruder had an inner diameter of 30 mm, and the extrusion die was an annular one in which the nozzle diameter was 2 mm and the length-to-inner diameter ratio (L/D) was 2.0. In the extrusion operation the die temperature was set at 235° C. The extruded material was solidified by cooling with 0° C. water and then was wound on a bobbin via guide rolls. The winding operation was carried out at a draft ratio of 9 and at a rate of 35 m/min. After vacuum drying at room temperature for about 48 hr to remove free water, about 500 pieces of the string-shaped polymer blend were arranged in parallel and bound into a sheet-like form 2 mm thick and 250 mm wide. Using a pair of calendering rolls which provided a clearance of 0.2 mm therebetween and were kept heated at 60° C., the sheet-like material was rolled into a thin and about ten times wider sheet. The thus prepared short fiber reinforced rubber composition will be referred to as master batch No. 1. The preparation method employed herein is generally in accordance with the method described in Japanese patent application provisional publication No. 59-43041.

2. Isolation of Short Fiber from Master Batch and Measurement of the Rate of Grafting At room temperature 2 g of the master batch No. 1 was put into 200 ml of benzene to dissolve the rubber component of the reinforced rubber composition, and the resultant slurry was divided into a solution portion and a precipitate portion by centrifuging at room temperature. For the precipitate portion, the rubber dissolving and centrifuging procedure was repeated seven times. After that the precipitate portion was dried to obtain short fiber of nylon.

A sample of the obtained nylon fiber was dissolved in a mixture of 1 part by weight of phenol and 3 parts by weight of o-dichlorobenzene, and the solution was subjected to H (hydrogen) nuclear magnetic resonance (NMR) spectral analysis. The internal standard was tetramethylsilane. From the NMR chart, the molar ratio of 6-nylon to natural rubber was determined by the cut-out area method for the peaks of the methyl group and methylene groups attributed to natural rubber and the methylene group adjacent the carbonyl group, methylene group adjacent the imino group and the remaining three methylene groups attributed to 6-nylon, and the rate of grafting was calculated from the molar ratio. In the master batch No. 1 the content of the short fiber of nylon was 33% by weight, and the rate of grafting of the fiber was 15%.

On about 200 filaments of the nylon fiber isolated from the master batch No. 1, the cross-sectional shape and size were examined with a scanning electron microscope of a magnifying power of 10,000. The filaments of the nylon fiber were almost uniformly very thin and circular in cross sections and had a mean diameter of 0.1 μm.

3. Preparation of Bead Filler

A rubber composition for use as a bead filler material was prepared by blending the master batch No. 1 with carbon black and other auxiliary ingredients as shown in Table 1. The blend was kneaded in a Banbury mixer which was kept heated at 70° C. and operated at 70 rpm. The liquid isoprene rubber used in this composition was LIR-50 (tradename) from Kurare Isoprene Rubber Co.

In Table 1, the amount of short fiber in the rubber composition is given by parts by weight per 100 parts by weight of rubbers in the composition.

Using an extruder the rubber composition was formed into the shape of a bead filler for a tire for passenger cars. In the extrusion die used for this purpose, the ratio of length to inner diameter (L/D) was about 1.7, which is a relatively small value, with the intention of enhancing the degree of orientation of the short fiber in the rubber composition in the direction of extrusion. In forming a bead filler according to the invention by extrusion, it is desirable to use an extrusion die which is small in the value of L/D and has a sufficiently small inner diameter compared with the inner diameter of the screw section of the extruder. In other words, the short fiber is oriented more efficiently as the gradient of the speed in the direction of extrusion becomes greater in the die section. The degree of anisotropy of the extruded rubber composition depends greatly on the manner of orientation of the short fiber and becomes higher as the degree of orientation becomes higher.

TABLE 1

|  | Example 1 | Reference 1 | (parts by weight) Reference 2 |
| --- | --- | --- | --- |
| Master Batch No. 1 | 120 | — | — |
| Natural Rubber | 10 | 100 | 100 |
| Liquid Isoprene Rubber | 10 | — | — |
| Carbon Black (HAF) | 60 | 60 | 70 |
| Spindle Oil | 10 | — | 10 |
| Novolak Type Phenolic Resin | — | 8 | — |
| Novolak Type Cashew Modified Phenolic Resin | — | 8 | — |
| Stearic Acid | 2 | 2 | 2 |
| Antioxidant | 1 | 1 | 1 |
| Zinc Oxide | 6 | 7 | 7 |
| Hexamethylene Tetramine | — | 1.8 | — |
| Vulcanization Accelerator (Nobs) | 1.0 | 1.5 | 1.0 |
| Insoluble Sulfur | 5 | 5 | 7 |
| Retarder | 0.5 | 0.5 | 0.4 |
| Amount of Short Fiber | 60 (phr) | 0 | 0 |

REFERENCES 1 AND 2

For comparison, two kinds of rubber compositions were prepared by using the materials shown in Table 1. As can be seen, these rubber compositions were prepared without using the short fiber prepared in Example 1 or any alternative fiber. The novolak type cashew modified phenolic resin used in Reference 1 was one prepared by using 40 parts by weight of cashew nut shell oil per 100 parts by weight of phenol.

The rubber compositions of References 1 and 2 were each formed into the shape of the bead filler mentioned in Example 1.

Using the bead fillers of Example 1 and References 1 and 2, respectively, three kinds of sample radial-ply tires for passenger cars classified as 185/70 HR 14 were produced. The three kinds of sample tires were identical in both the construction and materials except the differences in the bead filler material. These sample tires were subjected to the following evaluation tests. The results are shown in Table 2.

EVALUATION TESTS

1. Modulus of Elasticity

A sample tire of each kind was dissected to take out the bead fillers, and 1 mm thick test pieces were sliced out of the bead fillers. The elastic modulus (A) and elastic modulus (B) as defined hereinbefore were measured by a tensile test on these test pieces.

2. Side Force at Steering Angle of 1°

Each sample tire was run on a motor-driven drum at a constant speed of 30 km/hr under a load 60% of the maximum load specified by JIS (Japanese Industrial Standard) to measure a force which develops in the direction of an axis normal to the equatorial plane of the tire at a steering angle of 1°.

3. Maximum Side Force

Each sample tire was run on a motor-driven drum under the above described speed and load conditions, and the steering angle was varied to determine the maximum value of a force which develops in the direction of an axis normal to the equatorial plane of the tire.

In Table 2 the measurements are indicated by indexes. As the maximum side force index is larger, the tire is better in controllability and stability. In general, the side force reaches the maximum value when the steering angle is increased to a certain extent and again lowers as the steering angle is further increased.

4. Torsional Rigidity

A flat plate was pressed against the sample tire under 100% load specified by JIS, and the tire was twisted in the direction parallel to the flat plate to measure the rigidity under that condition.

In Table 2 the measurements are indicated by indexes. As the torsional rigidity index is larger the tire is better in controllability and stability at high speeds. In a strict sense the torsional rigidity must be measured while the tire is rotating, but the above static test method was employed because of the lack of a suitable test method for rotating tires.

5. Feeling Test on Controllability and Stability

The three kinds of sample tires were alternately installed on a passenger car, and professional drivers drove the car to evaluate the controllability and stability of the tested tires by feeling. The drivers gave one of the following marks to each sample tire in comparison with the tire of Reference 1 which was taken as a control.

0: "not different"
+2: "slightly better"
+4: "appreciably better"
+8: "distinctly better"

The total of the marks given by all the drivers was converted into an index on the basis of 100 for the control. Of course a larger index implies a better tire.

6. Ride Comfort

Each sample tire was run on a motor-driven drum having a small projection on the surface to measure the amplitude of a reaction force which develops on the axis of rotation of the tire upon passage of the tire over the projection. The amplitude of such a reaction force represents the shock- and vibration-absorbing capability of the tested tire. Furthermore, the vibration damping capability was evaluated by calculating the vibration damping time from the following equation. The amplitude of the reaction force and the vibration damping time were taken each as a measurement of the enveloping power or ride comfort performance of the tire.

$$F(t) = B \cdot \exp(-\gamma T) \cdot \sin[2\pi(t - t_1/T]$$

wherein F(T) is impact force, B is the amplitude of vibration, $\gamma$ is a damping coefficient, and T is the period of vibration.

The vibration damping time means a length of time elapsed before attenuation of the amplitude of vibration B to B/e and, hence, is given by the following equation.

$$t_1 = 1/\gamma$$

In Table 2 the results of the measurement and calculation are indicated by indexes. As these indexes are larger, the tire is greater in the enveloping power and better in ride comfort.

7. Feeling Test on Ride Comfort

The test method was similar to the above described method of feeling test on controllability and stability. In this case the drivers evaluated the ride comfort of the tested tires by feeling and gave one of the following marks to each sample tire in comparison with the tire of Reference 2 which was taken as a control.

0: "not different"
+2: "slightly better"
+4: "appreciably better"
+8: "distinctly better"

The total of the marks given by all the drivers was converted into an index on the basis of 100 for the control. Of course a larger index implies a better tire in respect of ride comfort.

As can be seen in Table 2, the tires of Example 1 were distinctly better in both controllability and ride comfort than the tires of References 1 and 2 using bead fillers formed of conventional rubber compositions of isotropic properties.

TABLE 2

| | | Example 1 | Reference 1 | Reference 2 |
|---|---|---|---|---|
| Elastic Modulus (A) | | 80 kg/cm² | 58 kg/cm² | 26 kg/cm² |
| Elastic Modulus (B) | | 25 kg/cm² | 57 kg/cm² | 25 kg/cm² |
| (A)/(B) | | 3.2 | 1.0 | 1.0 |
| Side Force at Steering Angle of 1° | | 105 | 100 | 94 |
| Maximum Side Force | | 104 | 100 | 96 |
| Torsional Rigidity | | 101 | 100 | 98 |
| Feeling Test on Controllability and Stability | | 110 | 100 | 85 |
| Amplitude of Vertical Reaction Force | low speed | 101 | 92 | 100 |
| | high | 100 | 95 | 100 |
| at Passage over Projection | speed | | | |
| Amplitude of Horizontal Reaction Force at Passage over Projection | low speed | 100 | 97 | 100 |
| | high speed | 105 | 98 | 100 |
| Vertical Vibration Damping Time at Passage over Projection | low speed | 100 | 94 | 100 |
| | high speed | 108 | 94 | 100 |
| Horizontal Vibration Damping Time at Passage over Projection | low speed | 101 | 93 | 100 |
| | high speed | 106 | 93 | 100 |
| Feeling Test on Ride Comfort | | 108 | 80 | 100 |

Notes:
"low speed": speed range of 20–50 km/hr
"high speed": speed range of 60–120 km/hr

EXAMPLES 2–4

Using the short fiber containing master batch No. 1 prepared in Example 1 and other materials as shown in Table 3, three different kinds of bead filler rubber compositions were prepared by the same method as in Example 1. Each of these rubber compositions was formed into the shape of the bead filler by using the extruder described in Example 1.

REFERENCES 3 AND 4

For comparison, two kinds of bead filler rubber compositions were prepared by using the materials shown in Table 3. In Reference 4, a master batch No. 2 was prepared by the method of preparing the master batch No. 1 in Example 1 except that the amount of 6-nylon was increased and that the 6-nylon powder used in this case was larger in mean particle size. In the master batch No. 2 the content of the short fiber of nylon was 50% by weight and the rate of grafting of the fiber was 12%, and the fiber filaments had a mean diameter of 0.2 μm.

The rubber compositions of References 3 and 4 were each formed into the shape of the bead filler by extrusion.

TABLE 3

| | Ref. 3 | Ex. 2 | Ex. 3 | Ex. 4 | Ref. 4 |
|---|---|---|---|---|---|
| Master Batch No. 1 | 30 | 75 | 105 | 150 | — |
| Master Batch No. 2 | — | — | — | — | 150 |
| Natural Rubber | 80 | 50 | 30 | — | — |
| Liquid Isoprene Rubber (LIR-50) | — | — | — | — | 25 |
| Carbon Black (HAF) | 60 | 60 | 55 | 50 | 30 |
| Spindle Oil | 10 | 10 | 10 | 10 | 10 |
| Stearic Acid | 2 | 2 | 2 | 2 | 2 |
| Antioxidant | 1 | 1 | 1 | 1 | 1 |
| Zinc Oxide | 6 | 7 | 7 | 7 | 7 |
| Vulcanization Accelerator (Nobs) | 1.0 | 1.0 | 1.0 | 1.0 | 1.0 |
| Insoluble Sulfur | 5 | 5 | 5 | 5 | 4 |
| Retarder | 0.5 | 0.5 | 0.5 | 0.5 | 0.5 |
| Amount of Short Fiber (phr) | 10 | 25 | 35 | 50 | 75 |

Using the bead fillers of Examples 2-4 and References 3-4, respectively, five kinds of sample radial-ply tires of the aforementioned class were produced. These sample tires were subjected to the evaluation tests described hereinbefore and also to a high-load endurance test. In the endurance test each sample tire was run on a motor-driven drum until damaging at a constant speed of 60 km/hr under a load of 140% of the maximum load specified by JIS. The endurance time was proportionally converted into an index relative to the performance of a control. The results of all the tests are shown in Table 4. The tire of Reference 1 was taken as a control in the tests for the side force at the specified steering angle and the maximum side force and also in the feeling test on the controllability, and the tire of Reference 2 was taken as a control in the other tests relating to ride comfort or endurance.

TABLE 4

|  |  | Ref. 3 | Ex. 2 | Ex. 3 | Ex. 4 | Ref. 4 |
| --- | --- | --- | --- | --- | --- | --- |
| Elastic Modulus (A) ($kg/cm^2$) |  | 36 | 48 | 68 | 120 | 93 |
| Elastic Modulus (B) ($kg/cm^2$) |  | 20 | 22 | 22 | 22 | 15 |
| (A)/(B) |  | 1.8 | 2.2 | 3.1 | 5.5 | 6.2 |
| Side Force at Steering Angle of 1° |  | 96 | 100 | 103 | 110 | 106 |
| Maximum Side Force |  | 96 | 100 | 102 | 104 | 102 |
| Feeling Test on Controllability and Stability |  | 88 | 100 | 110 | 120 | 107 |
| Amplitude of Vertical Reaction Force at Passage over Projection | low speed | 108 | 108 | 107 | 102 | 110 |
| | high speed | 108 | 108 | 106 | 102 | 112 |
| Amplitude of Horizontal Reaction Force at Passage over Projection | low speed | 110 | 109 | 109 | 107 | 110 |
| | high speed | 111 | 110 | 110 | 108 | 107 |
| Vertical Vibration Damping Time at Passage over Projection | low speed | 99 | 100 | 101 | 101 | 103 |
| | high speed | 99 | 100 | 102 | 101 | 104 |
| Horizontal Vibration Damping Time at Passage over Projection | low speed | 101 | 103 | 102 | 100 | 103 |
| | high speed | 101 | 102 | 103 | 100 | 102 |
| Feeling Test on Ride Comfort |  | 110 | 109 | 106 | 105 | 112 |
| High load Endurance |  | 92 | 110 | 155 | 148 | 85 |

Notes:
"low speed": speed range of 20-50 km/hr
"high speed": speed range of 60-120 km/hr As can be seen in Table 4, the tire of Examples 2-4 of the invention were remarkedly better than the tires of References 3 and 4, which are outside of the scope of the invention, in respect of the elastic modulus ratio (A)/(B) or the degree of anisotropy of the bead fillers, in controllability and stability, in ride comfort and also in endurance. These test results are demonstrative of the suitableness of limiting the elastic modulus ratio (A)/(B) within the range from 2.0 to 6.0 and preferably within the narrower range from 3.0 to 6.0.

EXAMPLES 5 AND 6

Using the master batch No. 1 prepared in Example 1 and other materials as shown in Table 5, two different kinds of bead filler rubber compositions were prepared by the same method as in Example 1. Each of these rubber compositions was formed into the shape of the bead filler by using the aforementioned extruder.

The isoprene rubber used in Examples 5 and 6 was IR 2200 (tradename) from Japan Synthetic Rubber Co., Ltd., and the butadiene rubber was BRO1 from Japan Synthetic Rubber Co.

REFERENCE 5

For comparison, a different kind of bead filler rubber composition was prepared by using the materials shown in Table 5. This rubber composition was formed into the shape of the bead filler by extrusion.

Using the bead fillers of Examples 5 and 6 and Reference 5, respectively, three kinds of sample radial-ply tires of aforementioned class were produced. For these sample tires, the elastic modulus (A) and elastic modulus (B) of the bead fillers, side force at a steering angle of 1° and the maximum side force were measured by the methods described hereinbefore. The tire of Reference 1 was taken as a control. The results are contained in Table 5.

TABLE 5

|  | (amounts of materials: parts by weight) | | |
| --- | --- | --- | --- |
|  | Reference 5 | Example 5 | Example 6 |
| Master Batch No. 1 | 90 | 90 | 90 |
| Isoprene Rubber (IR 2200) | 25 | 25 | 25 |
| Butadiene Rubber (BRO1) | 10 | 10 | 10 |
| Liquid Isoprene Rubber (LIR-50) | 5 | 5 | 5 |
| Carbon Black (ISAF) | 20 | 35 | 50 |
| Aromatic Oil | 5 | 5 | 5 |
| Stearic Acid | 2 | 2 | 2 |
| Antioxidant | 1 | 1 | 1 |
| Zinc Oxide | 6 | 6 | 6 |
| Vulcanization Accelerator (Nobs) | 1.0 | 1.0 | 1.0 |
| Insoluble Sulfur | 6 | 6 | 6 |
| Retarder | 0.5 | 0.5 | 0.5 |
| Amount of Short Fiber (phr) | 30 | 30 | 30 |
| Elastic Modulus (A) | 36 $kg/cm^2$ | 56 $kg/cm^2$ | 68 $kg/cm^2$ |
| Elastic Modulus (B) | 13 $kg/cm^2$ | 18 $kg/cm^2$ | 21 $kg/cm^2$ |
| (A)/(B) | 3.1 | 3.1 | 3.2 |
| Side Force at Steering Angle of 1° | 96 | 105 | 107 |
| Maximum Side Force | 96 | 104 | 107 |

EXAMPLES 7 AND 8

In Examples 7 and 8, short fiber containing master batches Nos. 3 and 4 were prepared by the method of preparing the master batch No. 1 in Example 1 except that 6-nylon powders different in mean particle size were used.

The master batches Nos. 3 and 4 both contained 33% by weight of short fiber. In the master batch No. 3 the rate of grafting of the fiber was 9%, and the fiber filaments had a mean diameter of 0.8 $\mu m$. In the master batch No. 4 the rate of grafting of the fiber was 11%, and the fiber filaments had a mean diameter of 0.4 $\mu m$.

Using the master batches Nos. 3 and 4, respectively, and the other materials as shown in Table 6, two kinds of bead filler rubber compositions were prepared by the same method as in Example 1. The styrene-butadiene rubber used in Examples 7 and 8 was SBR 1500 (tradename) from Japan Synthetic Rubber Co., Ltd. Each of these rubber compositions was formed into the shape of the bead filler by using the extruder described in Example 1.

REFERENCE 6

Another master batch No. 5 containing short fiber of nylon was prepared by the method of preparing the master batch No. 1 in Example 1 except that a 6-nylon powder different in mean particle size was used. In the master batch No. 5 the content of short fiber was 33% by weight and the rate of grafting of the fiber was 8%, and the fiber filaments had a mean diameter of 1.1 μm. Using the master batch No. 5 and other materials shown in Table 6, a bead filler rubber composition was prepared by the same method as in Example 1. This rubber composition was formed into the bead filler by extrusion.

Using the bead fillers of Examples 7 and 8 and Reference 6, respectively, three kinds of sample radial-ply tires of aforementioned class were produced. For these sample tires, the elastic modulus (A) and elastic modulus (B) of the bead fillers were measured, and the high load endurance test described in Examples 2-4 was performed. The results are contained in Table 6.

The test results shown in Table 6 indicate that when the short fiber in the bead fillers has a mean diameter greater than 1 μm it is difficult to obtain a high-performance tire of satisfactory durability even though the bead filler rubber composition exhibits an appropriate degree of anisotropy.

TABLE 6

| | (amounts of materials: parts by weight) | | |
|---|---|---|---|
| | Example 7 | Example 8 | Reference 6 |
| Master Batch No. 3 | 90 | — | — |
| Master Batch No. 4 | — | 90 | — |
| Master Batch No. 5 | — | — | 90 |
| Isoprene Rubber (IR 2200) | 30 | 30 | 30 |
| Styrene-butadiene Rubber (SBR 1500) | 10 | 10 | 10 |
| Carbon Black (FEF) | 60 | 60 | 60 |
| Aromatic Oil | 10 | 10 | 10 |
| Stearic Acid | 2 | 2 | 2 |
| Antioxidant | 1 | 1 | 1 |
| Zinc Oxide | 6 | 6 | 6 |
| Vulcanization Accelerator | 1.2 | 1.2 | 1.2 |
| Insoluble Sulfur | 6 | 6 | 6 |
| Retarder | 0.3 | 0.3 | 0.3 |
| Amount of Short Fiber (phr) | 30 | 30 | 30 |
| Elastic Modulus (A) | 71 kg/cm² | 76 kg/cm² | 65 kg/cm² |
| Elastic Modulus (B) | 22 kg/cm² | 23 kg/cm² | 22 kg/cm² |
| (A)/(B) | 3.1 | 3.2 | 3.1 |
| High Load Endurance | 136 | 158 | 65 |

EXAMPLE 9

A bead filler rubber composition was prepared by using the materials shown in Table 7. In this case, the short fiber was of syndiotactic 1,2-polybutadiene. The fiber filaments had a mean diameter of 0.2 μm, and the maximum diameter of the filaments was 2.9 μm, This rubber composition was formed into the shape of the bead filler by using the extruder described in Example 1.

TABLE 7

| | (parts by weight) Example 9 |
|---|---|
| Natural Rubber | 100 |
| Carbon Black | 50 |
| Aromatic Oil | 5 |
| Stearic Acid | 2 |
| Zinc Oxide | 3.5 |
| Vulcanization Accelerator (Nobs) | 0.5 |
| Insoluble Sulfur | 1.5 |
| Short Fiber of syn-1,2-polybutadiene | 40 |

Using the bead fillers of Example 9, sample radial-ply tires of the aforementioned class were produced. These sample tires were subjected to the evaluation tests described in connection with Example 1. Table 8 shows the test results in comparison with the results of the same tests for the sample tires of References 1 and 2 in which the bead fillers did not contain any fiber.

TABLE 8

| | | Example 9 | Reference 1 | Reference 2 |
|---|---|---|---|---|
| Elastic Modulus (A) | | 74 kg/cm² | 58 kg/cm² | 26 kg/cm² |
| Elastic Modulus (B) | | 24 kg/cm² | 57 kg/cm² | 25 kg/cm² |
| (A)/(B) | | 3.1 | 1.0 | 1.0 |
| Side Force at Steering Angle of 1° | | 104 | 100 | 94 |
| Maximum Side Force | | 103 | 100 | 96 |
| Torsional Rigidity | | 101 | 100 | 98 |
| Feeling Test on Controllability and Stability | | 108 | 100 | 85 |
| Amplitude of Vertical Reaction Force at Passage over Projection | low speed | 101 | 92 | 100 |
| | high speed | 100 | 95 | 100 |
| Amplitude of Horizontal Reaction Force at Passage over Projection | low speed | 100 | 97 | 100 |
| | high speed | 103 | 98 | 100 |
| Vertical Vibration Damping | low speed | 100 | 94 | 100 |
| Time at Passage over Projection | high speed | 107 | 94 | 100 |
| Horizontal Vibration Damping | low speed | 101 | 93 | 100 |
| Time at Passage over Projection | high speed | 104 | 93 | 100 |
| Feeling Test on Ride Comfort | | 106 | 80 | 100 |

Notes:
"low speed": speed range of 20-50 km/hr
"high speed": speed range of 60-120 km/hr Thus, Example 9 illustrates that the effects of using short fiber of syndiotactic 1,2-polybutadiene in the bead fillers are almost comparable to the effects of using short fiber of nylon as in Example 1.

In the foregoing examples the invention is embodied in radial-ply tires of a specific class for passenger cars, but this is not limitative. This invention is useful for various types of tires including bias-ply tires, belted bias-ply tires and radial-ply tires using an organic fiber belt. As a matter of course, tires according to the invention are not necessarily for passenger cars. Tires of larger sizes for trucks and other vehicles are also within the scope of the invention.

What is claimed is:

1. A high-performance pneumatic tire comprising:
   a tread;
   side walls;
   a carcass which comprises layers of rubberized cords laid parallel and is wrapped around a bead in each edge portion thereof so as to provide a turn-up portion; and a bead filler for each bead, which fills up a space between the turn-up portion of the carcass and a major portion of the carcass and extends along the outer side of the carcass toward the tread, each bead filler comprising a rubber composition which comprises about 100 parts by weight of a rubber component and from about 15 to 70 parts by weight of short fiber filaments having a mean diameter of less than about 1 μm wherein the material of said short fiber filaments comprises a thermoplastic polymer, said fibers being oriented to an extent sufficient so that the rubber composition is anisotropic to a degree that the modulus of elasticity of the bead filler measured under tension in the circumferential direction of the tire to the extent of about 20% stretch is greater than about 40 kg/cm² and is in a range of between about 2 and about 6 times as high as the modulus of elasticity of said bead filler measured under tension in the radial direction of the tire to the extent of about 20% stretch.

2. A tire according to claim 1, wherein the material of said short fiber filaments comprise syndiotactic 1,2-polybutadiene.

3. A tire according to claim 1, wherein the material of said short fiber filaments comprise isotactic polypropylene.

4. A high-performance pneumatic tire comprising:
a tread;
side walls;
a carcass which comprises layers of rubberized cords laid parallel and is wrapped around a bead in each edge portion thereof so as to provide a turn-up portion; and
a bead filler for each bead, which fills up a space between the turn-up portion of the carcass and a major portion of the carcass and extends along the outer side of the carcass toward the tread, each bead filler comprising a rubber composition which comprises about 100 parts by weight of a rubber component and from about 15 to 70 parts by weight of short fiber filaments having a mean diameter of less than about 1 μm wherein the material of said short fiber filaments comprises a thermoplastic polymer having an acid amide bond represented by the formula:

said rubber composition being anisotropic such that the modulus of elasticity of the bead filler measured under tension in the circumferential direction of the tire to the extent of about 20% stretch is greater than about 40 kg/cm² and is in a range of between about 2.0 and about 6.0 times as high as the modulus of elasticity of said bead filler measured under tension in the radial direction of the tire to the extent of about 20% stretch.

5. A tire according to claim 4, wherein at least a portion of said short fiber grafts to said rubber component via a novolak.

6. A tire according to claim 4, wherein said rubber composition comprises from about 25 to 60 parts by weight of said short fiber.

7. A tire according to claim 4, wherein the material of said short fiber filaments comprises nylon.

8. A tire according to claim 4, wherein the modulus of elasticity of each bead filler measured under tension in the circumferential direction of the tire to the extent of about 20% stretch is at least about 3 times as high as the modulus of elasticity of said bead filler measured under tension in the radial direction of the tire to the extent of about 20% stretch.

9. A tire according to claim 4, wherein said short fiber filaments have lengths in a range from about 1 μm to about 100 μm.

* * * * *